United States Patent [19]

Menke

[11] Patent Number: 4,466,762

[45] Date of Patent: Aug. 21, 1984

[54] TOOL FOR FORMING INTERNAL SCREW THREADS

[75] Inventor: Curtis M. Menke, Hendersonville, Tenn.

[73] Assignee: General Electric Company, Fort Wayne, Ind.

[21] Appl. No.: 273,155

[22] Filed: Jun. 12, 1981

[51] Int. Cl.[3] .......................... B23G 3/00; B23G 1/44; B23G 7/00; B27G 13/02

[52] U.S. Cl. .......................... 408/222; 408/219; 408/217; 408/215

[58] Field of Search ................ 409/143, 120; 408/222, 408/219, 217, 216, 215, 238, 239 R, 241 R

[56] References Cited

U.S. PATENT DOCUMENTS

| | | | |
|---|---|---|---|
| 1,174,994 | 3/1916 | Sharp | 408/217 |
| 2,275,097 | 3/1942 | Webb | 408/217 |
| 2,335,741 | 11/1943 | Contaldi | 408/222 |
| 2,671,381 | 3/1954 | Carlson | 409/143 |
| 2,949,064 | 8/1960 | Adcock | 409/143 |

FOREIGN PATENT DOCUMENTS

| | | | |
|---|---|---|---|
| 543472 | 3/1977 | U.S.S.R. | 408/222 |

*Primary Examiner*—E. R. Kazenske
*Assistant Examiner*—Paul M. Heyrana Sr.
*Attorney, Agent, or Firm*—Ralph E. Krisher, Jr.

[57] ABSTRACT

A thread forming tool comprising a metal cylinder having a thread tap mounted in an open-sided chamber in the cylinder so that the longitudinal axis of one set of teeth on the tap is parallel with the longitudinal center axis of the cylinder and positioned so the teeth project radially outward from the cylindrical surface of the cylinder. A lock structure secures the tap against rotation relative to the cylinder, and driving structure on the cylinder is operable to rotate it around its longitudinal center axis as the tap teeth form threads on a bore through which the cylinder is driven. Different size threads can be cut with a given tap by sequentially positioning the tap at different angles of rotation relative to a center line through the centers of the tap and the cylinder.

15 Claims, 4 Drawing Figures

TOOL FOR FORMING INTERNAL SCREW THREADS

BACKGROUND OF THE INVENTION

The invention relates to tools for forming internal threads on either generally smooth-sided bores through plate members or on previously threaded members that are to be re-shaped and, more particularly, relates to such a tool for cutting, rolling or otherwise reshaping threads in a bore that may be either of an unusually large diameter or of a non-standard diameter for which conventional thread taps either do not exist or are difficult or expensive to obtain. A tool constructed according to the invention can also be used to advantage in forming threads of a standard thread-tap size where the risk of damaging an expensive standard size thread tap is great enough to recommend use of the less expensive tap construction of the invention.

The use of thread tap tools to form internal screw threads on bores or other passageways through nuts or metal plate members is generally well-known. A large number of standardized sizes of different diameter thread taps are generally readily available in commerce for that purpose. Thus, it is often possible to readily obtain a standard thread tap for forming threads of a given desired size or pitch on the internal walls of a bore of a desired size. However, as the size of standard thread taps increases, the cost and often the unavailability, of such taps increases proportionately. Accordingly, for those wishing to form threads on a relatively large diameter bore, and having only infrequent need to form such threads, the cost of obtaining such a large-diameter thread tap may be prohibitive.

In addition to that problem associated with using commercially available prior art thread taps, there also exists the further difficulty of readily obtaining a thread tap having a particular diameter or thread pitch that may be desired for forming threads at a given time or location. For example, often in the repair or maintenance of machinery at locations where a large variety of commercial thread taps are not readily available, it is necessary to re-cut threads in an existing large diameter or non-standard bore on the machinery in order to expeditiously complete the repair or maintenance work. Before the present invention, the only solution to such problems was to incur the time penalty and expense associated with finding and acquiring a standard thread tap having the particular diameter and thread pitch needed to match the existing damaged threads. Of course, a less expensive and less time-consuming alternative would be desirable if one could be found.

A further disadvantage of prior art thread taps of large diameters is that they are expensive and can be damaged or rapidly worn out, particularly when used to cut threads in hardened metals. Thus, it would be desirable to provide a less expensive means for forming large-diameter threads particularly in hardened metals.

It would also be desirable to provide a conveniently usable thread tap that can be readily adjusted to form threads of different sizes in a plate member, thereby to obviate the earlier requirement of using more than a single standard-size tap to achieve such an objective.

OBJECTS OF THE INVENTION

A primary object of the invention is to provide a tool for forming internal screw threads, which tool overcomes the problems and disadvantages inherent in prior art thread taps, as mentioned above, and affords the desirable objectives noted above.

Another object of the invention is to provide a tool for inexpensively and quickly cutting, rolling or reshaping threads on the walls of large diameter, or non-standard diameter, bores in threaded nuts or other members having either generally smooth or threaded passages therein.

A further object of the invention is to provide a thread forming tool that is simple to manufacture, rugged in construction, and easy to operate, either manually or by a machine, to form threads on large diameter, non-standard diameter, or irregular diameter passageway walls.

Yet another object of the invention is to provide a relatively inexpensive thread forming tool for forming large diameter threads, or threads in a range of different sizes, in hardened metals, or in other applications that might either damage the tool or rapidly wear it out, thereby to afford a less costly way than was heretofore known for forming such threads.

Still another object of the invention is to provide a method for making a thread tap tool for forming threads on a passageway of uncommon diameter, or on a passageway having a particular size or pitch of threads that are to be re-shaped by the tool. An additional object of the invention is to provide a method for making a thread forming tool that can be easily fitted to a wide range of different size bores that are to be threaded by application of the tool, and that can be adjusted to cut a range of different size threads on the walls of a given bore.

Further objects and advantages of the invention will become apparent to those skilled in the art from the description of it presented herein considered in conjunction with the accompanying drawing.

SUMMARY OF THE INVENTION

In one preferred form of the invention a tool for forming internal screw threads on the walls of a generally cylindrical bore is formed of a metal cylinder having an open sided chamber, and a standard thread tap mounted in the open sided chamber, so that one set of teeth of the thread tap extends through and projects beyond the cylindrical outer surface of the metal cylinder. The thread tap is secured against rotation within the open sided chamber and drive means are provided on the metal cylinder for rotating it about its longitudinal center axis. When the drive means are operated to rotate the metal cylinder and associated thread tap within a threaded or unthreaded bore through a plate member, the projecting teeth of the thread tap are operable to either cut new threads on the walls of the bore or to reshape existing threads on those walls; provided that, according to the invention, the diameter of the metal cylinder is made to slidably fit, with a predetermined clearance tolerance, the existing bore through the plate member.

In the method of the invention a thread forming tool is manufactured by providing a metal cylinder that fits within a passageway that is to be threaded. An open-sided chamber is formed in the cylinder and a thread tap is mounted in the chamber so that one set of its teeth project radially outward through the open side of the chamber. Locking means are used to secure the tap at a desired angular position and against rotation relative to the metal cylinder, and the outer cylindrical surface of the cylinder is machined to provide a sliding fit, with a predetermined clearance, within the passageway. Driving means are provided on the metal cylinder for rotating it around its longitudinal axis to move the projecting tap teeth in cutting relation to the walls of the passageway that is to be threaded by the tool.

BRIEF DESCRIPTION OF THE PREFERRED EMBODIMENTS

Figure 1:
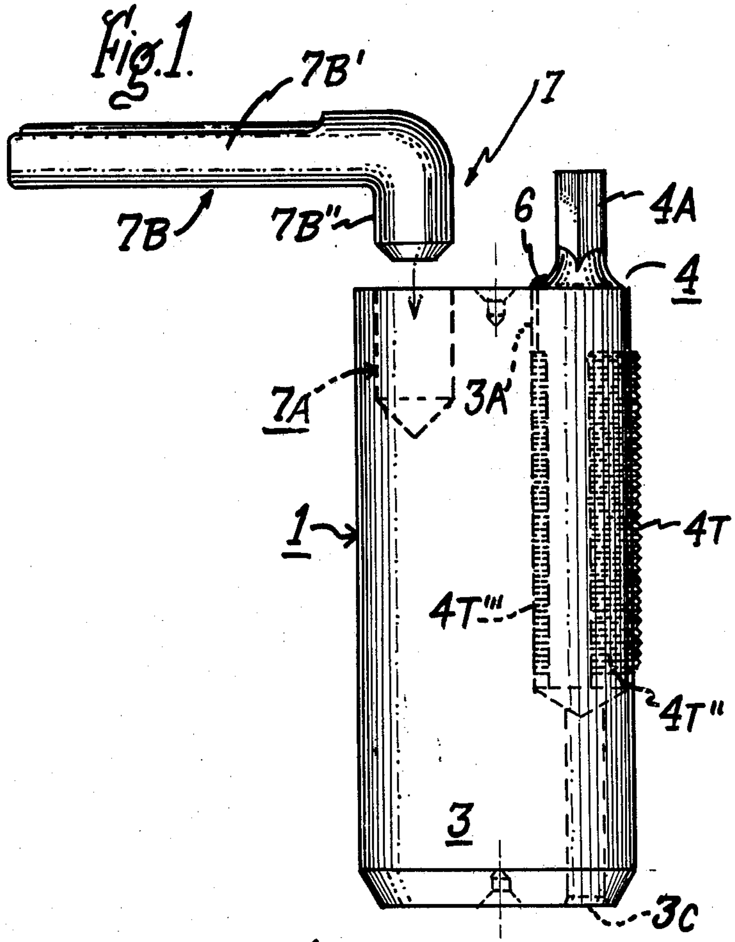
FIG. 1 is a side elevation, partly in phantom, showing a thread forming tool constructed according to the invention and including a separate crank handle for manually rotating the tool to operate it to cut threads on the walls of a passage through a plate member.

A preferred embodiment of the invention will now be described with initial reference to FIGS. 1 and 2 which show, respectively, a side and top view of a thread forming tool 1 that is operable to form threads on the walls of a generally cylindrical bore, such as the bore 2B in the metal plate member 2 shown in FIG. 2. At this point it should be understood that the tool 1 may be used to form threads initially in the generally smooth walls of a drilled hole in a plate member, or the tool may be used to simply re-shape existing threads on a threaded bore such as that formed in a conventional threaded nut. For the purpose of describing the invention, the plate member 2 shown in the drawing is simply a sheet of ½ inch thick steel, but from the following description of the invention it will be appreciated that many other types and configurations of plate members, threaded nuts or other articles may be suitably threaded by operation of the tool 1. Moreover, it will be understood that while the preferred embodiment of the invention is described with reference to a generally cylindrical bore 2B, the tool 1 can be used to form threads on at least the engageable surfaces of other configurations of passageways through a plate member. For example, the tool 1 can be used to cut threads on the respective flat sides of square, triangular or polygon shaped holes through a plate member, provided the diameter of the tool 1 is selected or made to fit appropriately relative to the minimum clearance diameter of such alternatively configured holes.

As seen in FIG. 1, the tool 1 includes a metal cylinder 3 of predetermined diameter that is suitably machined or otherwise precisely dimensioned to make its cylindrical walls fit slidably, with a predetermined clearance tolerance, within a bore, such as the bore 2B (FIG. 2) that is to be threaded by operation of the tool 1. An open sided chamber 3A is drilled or otherwise suitably formed to a desired depth in the cylinder 3. In the form of the invention shown in FIG. 1, the depth of the open sided chamber 3A is approximately two-thirds of the length of the cylinder, measured from its upper end, as seen in FIG. 1.

A standard, commercially available, thread tap 4 is disposed in chamber 3A with one set of its teeth 4T positioned to extend through the open side (3B) of the chamber 3A and project radially outward a preset distance beyond the outer cylindrical surface of the metal cylinder 3. The tap 4 is threaded into the open sided chamber 3A to cut threads in the walls thereof so that the longitudinal axis of the tap 4 is positioned substantially parallel to the longitudinal axis of the cylinder 3, and so that the tap 4 is held securely in position and cannot wobble within the chamber 3 when the teeth 4T of the tap are engaged in a thread forming operation.

In the disclosed form of the invention, the tap 4 has four sets of teeth separated from one another by grooves or longitudinal fluted areas in the body of the tap. Such a four-flute tap, or one with an even number of sets of teeth, is preferred so that one of the sets of teeth 4T''' will be diametrically opposite the cutting teeth 4T thereby to provide maximum diametrical sizing control and support for the tap. However, as few as three sets of teeth may be used successfully in practicing the invention, as will be explained more fully below.

In the form of the invention illustrated in the drawing, the open sided chamber 3A and the open side 3B (see FIG. 2) thereof both extend from one end of the cylinder 3, in this case the upper end as shown in FIG. 1, a predetermined distance down or into the cylinder, as shown in FIG. 1. In alternative embodiments of the invention, both the open sided chamber 3A and the open side thereof can be made to extend from one end of the cylinder 3 to the other end thereof, so that during operation of the thread cutting tool 1 metal removed from a bore, such as bore 2B in plate member 2, will fall readily away from the thread tap 4. In yet another alternative embodiment of the invention, the metal cylinder 3 includes a connecting passageway 3C that extends from the inner end of the generally cylindrical passageway 3A comprising the open sided chamber, to the other end of the metal cylinder, i.e., the bottom end as shown in FIG. 1, thereby to provide means for removing metal chips from the inner end of the generally cylindrical passageway 3A, through the connecting passageway 3C, as such chips are formed during a thread-cutting operation.

With the thread tap 4 threaded into the open-ended chamber or cylindrical passageway 3A, so that the shank portion 4A of the tap extends upward from the top surface of the metal cylinder 3, the tap is rotated to position one of its sets of threads 4T where they project radially outward through the open-side 3B of the open sided chamber 3A. The tap 4 should be positioned so that the projecting teeth 4T have their leading edge approximately on the center line projected through the center of cylinder 3 and the center of tap 4. Such positioning of the tap avoids undesirable drag on the teeth 4T when they are engaged in a thread cutting operation, and that optimum positioning of the tap affords proper sizing of the threads cut by the teeth.

At this point it should be noted that one of the objectives of the invention can be afforded by locking the tap 4 in a position such that the leading edge of teeth 4T is positioned about ten degrees behind the center line through the centers of cylinder 3 and tap 4. Such an arrangement enables the tool 1 to be used to cut smaller threads with a given size tap 4 than would be the case if the tap were locked in position with its leading edge on the aforementioned center line. Thus, it will be understood that by varying the angle of rotation of the leading edge of the teeth 4T relative to the noted center line, a range of different size threads can be cut using a single standard tap 4. Particularly, in instances where a deep thread is to be cut or a large diameter thread or low pitch thread is to be used, or where a thread is to be cut in unusually hard metal, it will be seen that by making two or more successive cutting passes with the tap 4 rotated to increase its bite on each such pass, the tool 1 can be readily adjusted to form such threads while minimizing the torque required to operate the tool.

In order to prevent the thread tap 4 from being twisted or wobbled within the open sided chamber 3A, there should, as mentioned above, be at least three equally spaced sets of teeth such as the teeth 4T, 4T' and 4T'' on the tap. In such an alternative embodiment, the sets of teeth should be equally spaced around the tap, as is conventional, so that two of the sets of teeth 4T' and 4T'' would be engaged with the threaded walls of the open sided chamber 3A at spaced points thereon to rigidly secure the tap with its central longitudinal axis parallel to the central longitudinal axis of the cylinder 3. With the teeth 4T thus arranged in cutting position relative to the exterior surface of the metal cylinder 3, means for securing the tap 4 against rotation within the open sided chamber 3A are applied. In either the four-fluted tap preferred embodiment, or in the alternative three-fluted embodiment of the invention, these means comprise a weld 6 joining the upper end of the metal cylinder 3 and the tap 4. In other embodiments of the invention other suitable securing means can be used to achieve such a locking relationship between the tap 4 and the chamber 3A of cylinder 3.

Figure 2:
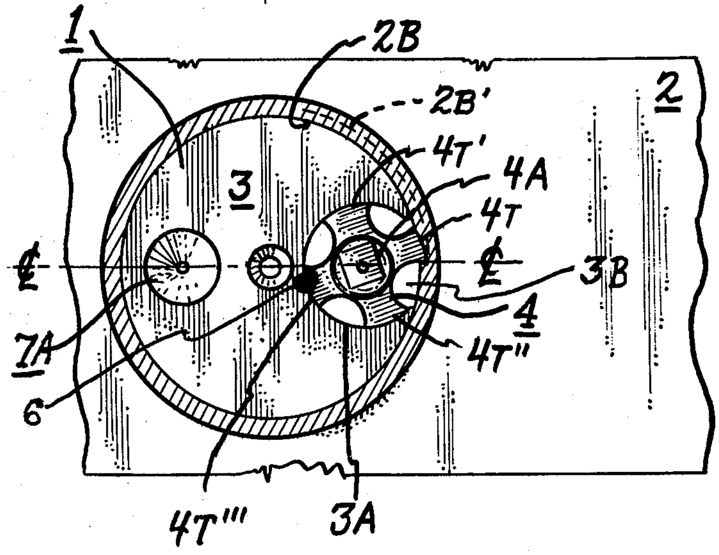
FIG. 2 is a top plan view, partly in phantom, showing the thread cutting tool illustrated in FIG. 1, positioned in cutting relationship to a plate member having a hole through it that is to be threaded by operation of the tool.
Figure 3:
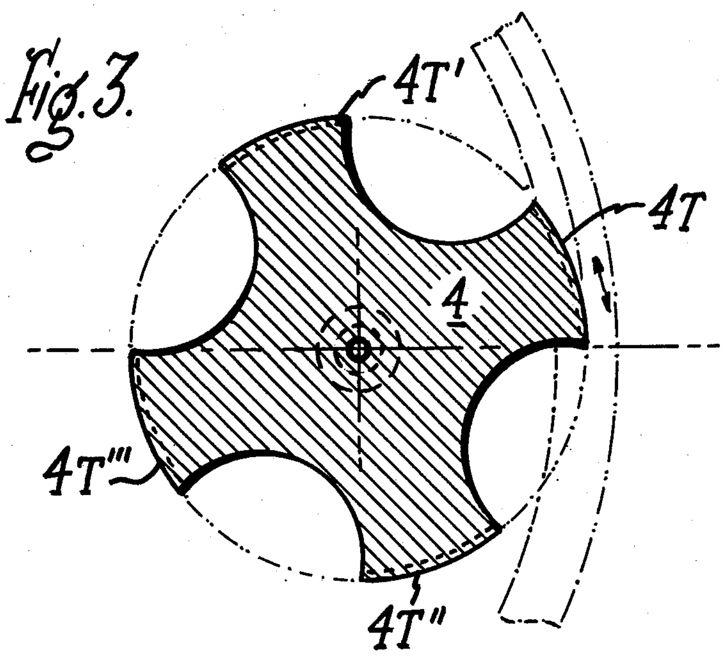
FIG. 3 is a fragmentary enlarged top plan view, in cross-section through the thread tap used in the tool shown in FIGS. 1 and 2, shown in relation to a portion of the plate member depicted in FIG. 2.
Figure 4:
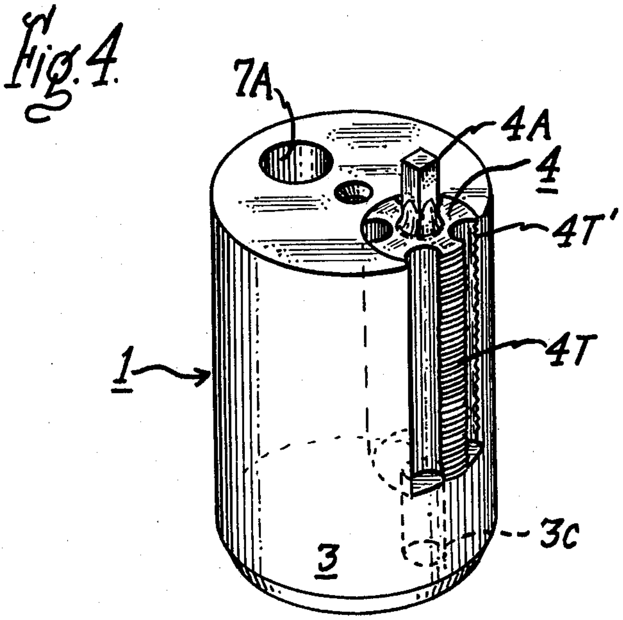
FIG. 4 is a perspective view, in reduced scale, of the thread forming tool shown in FIG. 1, without the crank handle illustrated in FIG. 1.

Finally, driving means are provided on the metal cylinder 3 for rotating it about its longitudinal axis and within the bore 2B of the plate member 2, thereby to cause the projecting teeth 4T of the tap 4 to form threads on the walls of the bore, as generally indicated by the phantom line 2B' in FIG. 2. In this embodiment of the invention the driving means 7 comprises a hole 7A formed in one end of the metal cylinder 3 for receiving therein a rigid tool 7B that is part of the driving means 7 and is operable to be engaged with the walls of the hole 7A and is operable with a suitable lever 7B' to rotate the metallic cylinder. In the simplest form of the invention, in lieu of the tool 7B (which comprises the pin portion 7B'' and the integral lever arm 7B') shown in FIG. 1, the driving means can consist simply of a metal pin (not shown, but shaped generally like the pin portion 7B'' of tool 7B) that is placed into the hole 7A and is used with a suitable rigid lever (not shown) that is inserted between the pin and the shank 4A of the thread tap 4 to rotate the cylinder 3 around its longitudinal axis.

In the form of the invention illustrated in FIG. 1, the rigid tool 7B includes a crank handle position 7B' that operates with a leg or pin portion 7B'' which can be positioned in the hole 7A to rotate the metal cylinder 3 around its longitudinal axis in a similar manner, i.e., by rotating the crank handle 7B into engagement with the shank 4A of the tap 4, thereby to apply torque to the cylinder 3. Of course, other types of drive means can be used to rotate the cylinder 3. For example, the leg portion 7B'' can be formed with a hexagonal configuration that is made to match a like configuration of the walls of hole 7A, so that the rigid tool can be rotated around its leg portion 7B'' to drive the cylinder 3 to rotate. It should be understood that in addition to such hand-tap modes of operation, the tool 1 can be operated as a machine tap, by providing a suitable conventional machine drive that operably interfaces with the shank 4A of the tap 4 and with either the hole 7A in the cylinder 3, a pin positioned in the hole, or with a suitably shaped hole having hexagonal walls for locking with the drive means.

From the foregoing description of preferred forms of the invention with its operation should be generally understood; however, in order to assure a complete and clear understanding of the operation of the invention, and to describe the method of the invention, the following method steps are set forth. When it is desired to form a thread, either by cutting or rolling new threads or by reshaping existing threads in a given size bore, such as the bore 2B shown in FIG. 2 of the drawing, one would construct and use the tool 1 of the invention, as follows. Assuming the bore 2B is of such a diameter that a standard thread tap is not readily available, or that the existing threads (2B') on such a bore are of a pitch for which a standard thread tap is not available, or that for any of the reasons noted above, a standard thread tap is not deemed to be more suitable for use than the tool of the invention, then a metal cylinder 3 is provided or suitably formed to have an outer diameter that fits within the inner diameter of the bore 2B. Having thus selected or machined a given diameter metal cylinder 3, next, an open sided chamber 3A is formed in cylinder 3 by drilling or otherwise machining an open ended passageway 3A into one end of the cylinder 3 and extending into it a desired predetermined distance, such as that shown in FIG. 1 of the drawing. The open side of the chamber is positioned to define a window in the outer cylindrical wall of metal cylinder 3.

A standard thread tap 4 is then selected having a diameter that is effective to leave one set of threads 4T of the tap projecting through the window radially outward from the outer surface of the cylinder 3 when the tap 4 is threaded into the open sided chamber 3A. Of course, the standard tap 4 selected for this purpose has a desired thread pitch on it that either matches the existing threads 2B' on the bore 2B, or that otherwise is suitable for the desired thread forming operation. After the thread tap 4 is threaded into the open sided chamber 3A to align one set of its teeth 4T relative to the center line through the center of tap 4 and the longitudinal center axis of the cylinder 3, as noted above, the tap 4 is fixed in relation to the cylinder 3 by forming a weld 6 to join those components together. In the event that a single cutting pass is to be made, the leading edge of the teeth 4 will be positioned approximately on said center line of cylinder 3 and tap 4. If two or more cutting passes are to be made for any of the reasons explained earlier, the tap 4 will initially be locked in position with its leading edge positioned counter-clockwise from said center line, assuming a right-hand thread is to be cut with tool 1. (It will be recognized that if a left-hand thread is to be cut with the tool 1, the directional callouts given above will be reversed.) For successive cutting passes, the tap 4 would be rotated to move the leading edge of teeth 4T to, or toward, said center line, where they would again be locked against rotation within passageway 3A, and a deeper cut taken on the threads being cut.

The cylindrical surface of cylinder 3 is then machined to accurately position the teeth 4T at a proper radial distance from the longitudinal axial center line of cylinder 3, thereby to allow the tap 4 to cut a full diameter hole. As is noted above, in the best mode of the invention a clearance tolerance for the sliding fit between the bore 2B and the surface of cylinder 3 is a clearance fit substantially equal to the diameter of cylinder 3 multiplied by one mil. Thus, if the diameter of bore 2B equals 3 inches, a clearance fit of 3×0.001 or 3 mils has been found desirable for threading the bore with the tool 1 of the invention.

To effect a thread cutting operation, one end of the cylinder 3, which in this case is the bottom tapered end shown in FIG. 1, is inserted into the bore 2B and a suitable driving means, such as the crank handle 7B shown in FIG. 1, is used by placing its driving-leg portion 7B″ into a hole 7A that has been previously formed (by drilling or otherwise) in the upper end of the cylinder 3, diametrically opposite the center line of the thread tap 4. The crank handle 7B is rotated until it engages the shank 4A of the thread tap 4 and then continued rotation of the handle 7B causes the cylinder 3 and tap 4 to rotate and either cut new threads on the bore or force the set of teeth 4T of the thread tap to reshape existing threads 2B′ on a bore. In the event that metal chips are formed by the threading operation, they can drop into the tapered inner end of the open sided passageway 3A, or if an alternative form of the invention is used such that the open sided chamber 3A extends the full length of the cylinder 3, such chips will simply drop through the open side of the chamber and away from the cylinder 3. If a form of cylinder 3 such as that shown in FIG. 1 is used, metal chips can fall through connecting passageway 3C from the chamber 3A.

In thus using the thread forming tool of the invention, it should be understood that a variety of different thread taps can be used with a suitably dimensioned metal cylinder, such as the cylinder 3. Specifically, the three standard different types of taps can be used, respectively, at different times with the cylinder 3 to enable it to perform the functions of a tapered tap, a bottoming tap or a serial or plug tap as such standard thread taps are sequentially positioned in the open sided chamber 3A and secured in fixed relation against rotation relative to it or the cylinder 3.

In addition, it will be recognized, that the tool 1 can be constructed using a standard thread rolling or forming tap instead of the cutting tap 4 specifically described and illustrated herein. Because such roll taps have no flutes, the axial position of such a standard roll tap relative to the center line through its center and the center of cylinder 3 is not as critical as with a cutting tap. A limiting factor in using such a roll tap is that minor sizing changes cannot be readily made in threads, in the manner explained above, whereby the angular position of the leading edge of the teeth of a cutting tap are varied to afford that objective.

From the foregoing description of the invention, it will be understood that a number of different size diameter cylinders 3 can be used, respectively, to form threads on different sizes of bores. Likewise, different sizes of standard thread taps can be used with such metal cylinders so long as the taps are secured in locking relationship to the taps and the cylinders on which they are mounted in the manner described above. Various other modifications and alternative embodiments of the invention can be developed from the teaching of it presented herein; thus, it is my intention to encompass within the following claims the true scope of the invention.

I claim:

1. A tool for forming internal screw threads on the walls of a generally cylindrical bore in a member, comprising a metal cylinder having a diameter that slidably fits, with a predetermined clearance tolerance, within the bore in said member, and having an open-sided chamber for receiving therein a thread tap, a thread tap disposed in said chamber with one set of its teeth extending through the open side of said chamber and projecting radially outward a preset distance beyond the outer surface of said cylinder, means interconnecting said thread tap and said cylinder for securing said tap against rotation within said chamber and in locking relationship therewith, and driving means for rotating the cylinder about its longitudinal axis and within the bore in said member thereby causing the projecting teeth of said tap to form threads on the walls of said bore.

2. An invention as defined in claim 1 wherein said open-sided chamber in the metal cylinder comprises a generally cylindrical passageway extending from one end of the metal cylinder to the other end of the cylinder, and wherein the longitudinal center axis of said thread tap is positioned substantially parallel to the longitudinal axis of said metal cylinder.

3. An invention as defined in claim 2 wherein the open side of said generally cylindrical passageway extends from one end of the metal cylinder to the other end of the cylinder.

4. An invention as defined in claim 3 wherein said generally cylindrical passageway has its inner cylindrical wall threaded to engage the threads of said thread tap when the tap is threaded into the passageway.

5. An invention as defined in claim 1 wherein said open sided chamber in the metal cylinder comprises a generally cylindrical passageway extending from one end of the metal cylinder to within a predetermined distance of the other end of the cylinder, and including a connecting passageway extending from the inner end of the generally cylindrical passageway to the other end of the metal cylinder thereby to provide means for removing metal chips from the inner end of the generally cylindrical passageway through such connecting passageway.

6. An invention as defined in claim 1 wherein said means for securing the tap against rotation comprises a weld joining the metal cylinder and the tap.

7. An invention as defined in claim 1 wherein said driving means comprises a hole formed in one end of the metal cylinder for receiving therein a rigid tool that is operable to be engaged with the walls of said hole to rotate the metallic cylinder.

8. An invention as defined in claim 7 wherein said rigid tool includes a crank handle that operates as a lever when rotated within said hole to move the rigid tool into engagement with said thread tap.

9. An invention as defined in claim 7 wherein the longitudinal center axis of said hole is in general alignment with the longitudinal center axis of the metal cylinder and of the thread tap.

10. An invention as defined in claim 1 wherein said thread tap has at least three sets of teeth defined therein by longitudinal grooves in the sides of the tap, and wherein the leading edge of the projecting teeth of said tap are in alignment with both the center line of the tap and the longitudinal center axis of said metallic cylinder.

11. An invention as defined in claim 1 wherein said thread tap has an even number of sets of teeth thereon and the leading edge of said one set of teeth projecting outward from the cylinder is positioned within about ten degrees of the center line through the center axes of said tap and cylinder.

12. An invention as defined in claim 11 wherein said leading edge of the projecting set of teeth is positioned about ten degrees away from said center line in a direction of rotation around the longitudinal axis of the thread tap that results in lessening the depth of cut of said teeth.

13. An invention as defined in claim 1 wherein said thread tap is a taper tap.

14. An invention as defined in claim 1 wherein said thread tap is a serial tap.

15. An invention as defined in claim 1 wheren said thread tap is a roll tap.

* * * * *